United States Patent
Rolfsen

[11] 3,735,773
[45] May 29, 1973

[54] PNEUMATIC TEMPERATURE RELEASER

[75] Inventor: Henrik Pande Rolfsen, Snaroya, Norway

[73] Assignee: Thune-Eureka A/S Drammensveien, Oslo, Norway

[22] Filed: Mar. 23, 1971

[21] Appl. No.: 127,222

[30] Foreign Application Priority Data

Apr. 3, 1970   Norway..................................1240/70

[52] U.S. Cl..................................137/74, 137/557
[51] Int. Cl..........................................F16k 17/38
[58] Field of Search..........................137/67–74; 122/504.1, 504.3; 220/89 A, 89 B; 73/389

[56] References Cited

UNITED STATES PATENTS

| 766,576 | 8/1904 | Altmann | 122/504.1 |
| 768,383 | 8/1904 | Lockwood | 122/504.1 |
| 842,725 | 1/1907 | Taylor | 137/74 X |
| 1,520,126 | 12/1924 | Harrold | 137/68 |
| 3,377,957 | 4/1968 | Bilton | 137/74 |

Primary Examiner—Martin P. Schwadron
Assistant Examiner—Richard Gerard
Attorney—Young & Thompson

[57] ABSTRACT

A gasfilled glass bulb which bursts when a predetermined temperature is reached is used as the valve body for closing a valve in a pipeline under pressure in which a pressure drop due to bursting of the bulb indicates a particular condition.

4 Claims, 1 Drawing Figure

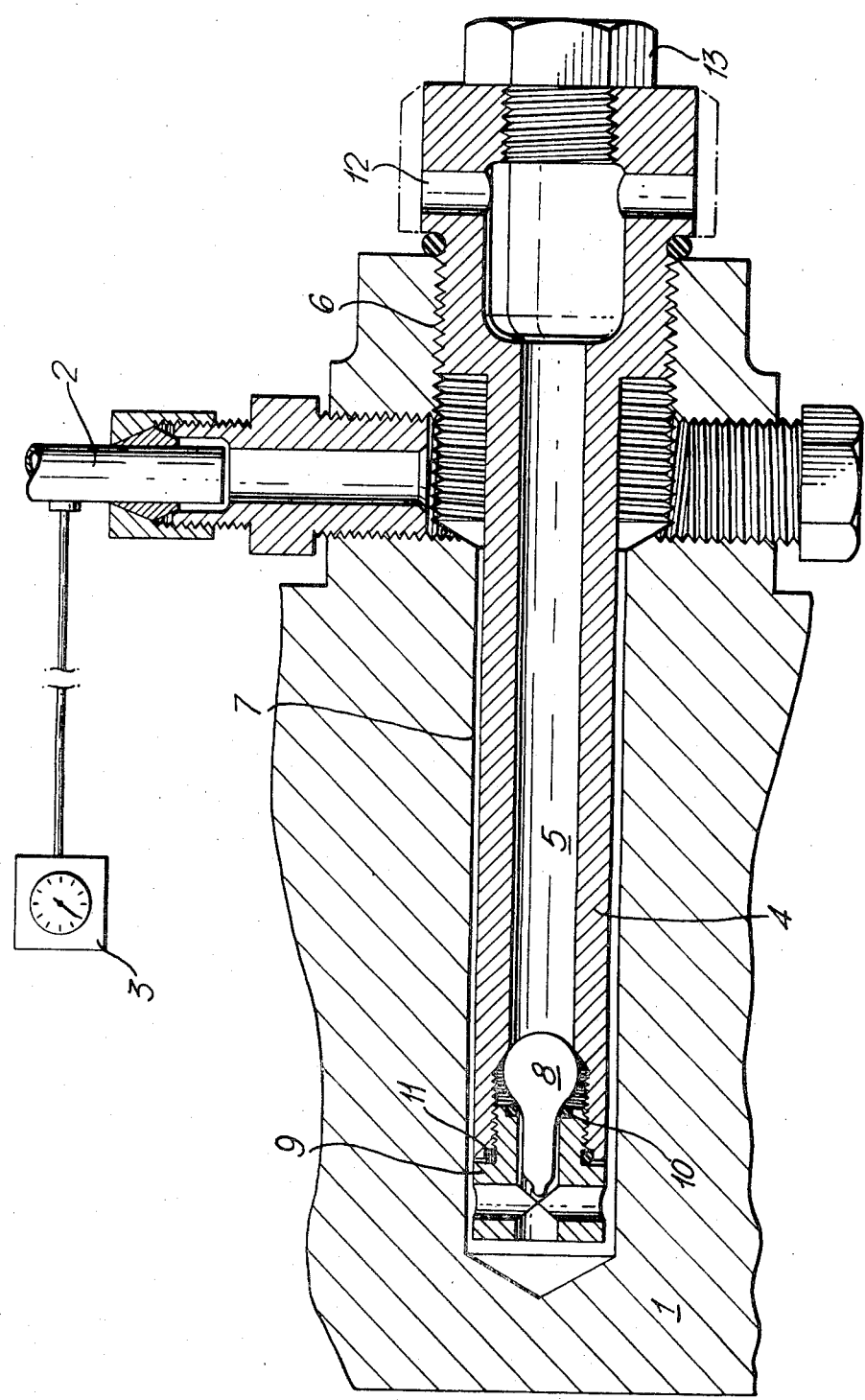

PNEUMATIC TEMPERATURE RELEASER

The present invention concerns an arrangement relating to pneumatic temperature releasers used to supervise machines and mechanical components of any kind.

A previously known version of temperature sensors of the kind here considered, forms a normally closed valve in the end of a compressed air line. When the temperature to be warned of is reached, the valve opens, and the pressure drop in the line indicates that danger may be present, as an example, in that the temperature has become excessive in loading and unloading pumps on board tankers.

The previously known version has included a movable, spring loaded valve body, kept blocked in a closed position by a temperature cartridge. A temperature cartridge is a small glass bulb, containing a gas or liquid in such quantity and of such properties that the pressure in the glass bulb, at a certain temperature, increases to the point where the bulb ruptures. A significant advantage of temperature cartridges is that their ability to rupture at the temperature they are designed for, is maintained, also after many years of storage and usage in places where the temperature perhaps never reaches alarming heights. This reliability of operation does, however, not extend to the movable parts of the valve. As an example, the parts may in time corrode such that they do not move, the gaskets may harden and leak, and the spring force which opens the valve when the cartridge breaks, may weaken in time, such that the valve may not function satisfactorily, when dangerous circumstances occur. With regards to safety, one must then carry out a continuous and expensive maintenance and inspections of temperature sensors of the kind here considered, and the purpose of the present invention is, for that reason, primarily to arrive at a temperature releaser which may stand uninfluenced for long periods without inspections and maintenance, and still with assurance that release will take place when the temperature sensed exceeds a predetermined limit.

According to the invention this is achieved in that the enclosure of the temperature bulb in itself constitutes the valve body in the temperature releaser. The temperature cartridge thus forms a tight closure for the compressed air in the temperature sensor which in this way does not have any movable parts at all. When the predetermined temperature is exceeded, the temperature cartridge, forming the valve body, ruptures, the temperature sensor becomes open such that the compressed air freely escapes to the surroundings from the above mentioned line, in which the pressure then suddenly drops.

The invention thus concerns an arrangement relating to a pneumatic temperature releaser of the kind where the temperature sensitive element is a temperature cartridge, preferably of glass, which ruptures at a certain temperature and which controls the opening of a through passage for compressed air from a connected air line, and the invention is characterized in that the temperature cartridge is arranged as a closing body in the through passage, which is opened when the cartridge ruptures.

Other features and details are indicated in the attached subclaims.

As an example, one embodiment of the invention will be further described below, with reference to the drawing which shows a section through a temperature releaser for the measure of the temperature in a machine part, which is indicated by 1. A compressed air line 2 is connected to a normally closed valve, such that the reading of a certain pressure by means of a manometer 3, indicates normal conditions. The temperature releaser includes, in the embodiment shown, a long tube 4 with a through passage 5. The tube 4 is by means of a threaded part 6 screwed into a drilled hole 7 in the machine part 1, and between the hole 7 and the tube 4 is provided such clearance that air from the compressed air line 2 may pass on the outside of the tube 4 to the left in the drawing and thereafter through the passage 5 to the right on the drawing, towards the surrounding air. The through passage 5, is, however, according to the invention, closed by a temperature cartridge 8, placed as a closing plug or a valve body in one end of the through passage, secured to this by a threaded bush 9 which is screwed into a correspondingly threaded bore in the tube 4, fitted with a yielding, tight gasket 10 facing the temperature cartridge 8, and a gasket 11, which seals the threaded connection between the bush 9 and the tube 4. The temperature cartridge 8 will rupture at a certain temperature as explained, and the air in the line 2 will then have free passage to the surroundings. The pressure drop will be registered on the manometer 3, which furthermore may give warning, institute safety precautions, disengage driving machinery etc. The through passage 5 goes at the right end of the drawing, to a crosswise passage 12, in order that particles from the ruptured temperature cartridge 8 should not be shot out, as an example, horizontally from the temperature releaser, but be deflected in safe directions. The through passage 5 is further closed by a plug 13. The plug 13 may be removed when testing the system. The temperature cartridge may then be broken manually from the outside with a suitable tool.

In the embodiment shown, the temperature releaser is, in addition to the high degree of reliability it provides also easily produced by simple machining operations, as an example, lathe turning operations, and as shown, it does not have any moving parts, and that which happens when the predetermined temperature which the temperature cartridge is designed for, is exceeded, is that the closing valve body ruptures into smithereens.

The example shown serves only to illustrate the invention and forms no limitation for the protection this patent gives, in that other embodiments falling within the framework of the invention may easily be considered.

Having described my invention, I claim:

1. A pneumatic temperature release comprising conduit means, a manometer in fluid communication with the conduit means, means for supplying compressed gas to the conduit means, a valve in the conduit means downstream of said manometer comprising a valve body in the form of a gas-filled bulb which closes the conduit means and which is adapted to burst at a predetermined temperature, said bulb being located in an enlarged portion of a bore in a housing mounted in said conduit means, said portion being closed by a plug which retains the bulb, said portion having a diameter larger than the bore, the manometer being in unimpeded fluid communication with the gasfilled bulb through the conduit means whereby the same pressures are applied by the compressed gas both to the manometer and to the bulb and the decrease in pressure upon rupture of the bulb is registered by the manometer without the intervention of intermediate moving parts.

2. A releaser as claimed in claim 1, and resilient gaskets between the bulb and the housing.

3. A releaser as claimed in claim 1, the bore in the housing having transverse outlets at its end remote from the bulb.

4. A releaser as claimed in claim 1, said housing being closed axially by a removable plug at the end of the housing remote from the bulb.

* * * * *